US012770644B1

(12) United States Patent
Benakli et al.

(10) Patent No.: US 12,770,644 B1
(45) Date of Patent: Oct. 20, 2026

(54) MAGNETIC WRITE POLE WITH LOW MAGNETIC MOMENT WRAPPER

(71) Applicant: Seagate Technology LLC, Fremont, CA (US)

(72) Inventors: Mourad Benakli, Eden Prairie, MN (US); Jianhua Xue, Maple Grove, MN (US); Michael Allen Seigler, Eden Prairie, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 19/273,710

(22) Filed: Jul. 18, 2025

(51) Int. Cl.
*G11B 5/127* (2006.01)
*G11B 5/00* (2006.01)

(52) U.S. Cl.
CPC ...... *G11B 5/127* (2013.01); *G11B 2005/0021* (2013.01)

(58) Field of Classification Search
CPC ........................ G11B 5/127; G11B 2005/0021
See application file for complete search history.

(56) References Cited

U.S. PATENT DOCUMENTS

| | | | | |
|---|---|---|---|---|
| 6,721,131 | B2 | 4/2004 | Litvinov et al. | |
| 8,873,351 | B1 * | 10/2014 | Aoki | G02B 6/1226 369/13.13 |
| 9,036,299 | B2 | 5/2015 | Chembrolu | |
| 9,053,722 | B1 * | 6/2015 | Burgos | G11B 5/314 |
| 10,923,145 | B2 | 2/2021 | Goncharov et al. | |
| 11,763,847 | B1 * | 9/2023 | Ellison | G11B 5/1871 369/13.33 |
| 2005/0073774 | A1 | 4/2005 | Wang et al. | |
| 2024/0144961 | A1 | 5/2024 | Asif Bashir et al. | |

* cited by examiner

*Primary Examiner* — Andrew Sasinowski
(74) *Attorney, Agent, or Firm* — Mueting Raasch Group

(57) ABSTRACT

Described are recording heads for magnetic writing of data in a disk drive, such as a heat-assisted magnetic recording disk drive, and in particular to write pole constructions that employ a low magnetic moment material disposed around the top and sides of the write pole tip. Accordingly, a low magnetic moment wrapper may disposed around a write pole, which may function to reduce side track erasure effects by setting up a magnetization gradient at the write pole edges to thereby control the erasure field.

16 Claims, 3 Drawing Sheets

MAGNETIC WRITE POLE WITH LOW MAGNETIC MOMENT WRAPPER

TECHNICAL FIELD

The disclosure relates to magnetic recording heads, and to write poles included in magnetic recording heads.

SUMMARY

In accordance with various aspects, the present disclosure describes heat-assisted magnetic recording disk drives that include magnetic storage media and a recording head. The recording head includes a write pole that extends to an air-bearing surface. At the air-bearing surface, the write pole has a top edge, a bottom edge, and side edges that extend between the top edge and the bottom edge. The write pole is configured to produce a magnetic write field for writing data on the magnetic storage media. The recording head further includes a near field transducer positioned proximate to the bottom edge of the write pole tip and configured to direct evanescent electromagnetic fields emanating from plasmon polaritons at the magnetic storage media to thereby facilitate magnetic recording. A low magnetic moment wrapper is disposed around the side edges and top edge of the write pole, the low magnetic moment wrapper having a magnetic moment that is lower than that of the write pole.

In certain aspects, the low magnetic moment wrapper is a single layer disposed around the side edges and the top edge of the write pole. In certain aspects, the low magnetic moment wrapper is a bi-layer disposed around the side edges and the top edge of the write pole, the bi-layer including a first layer of a first material and a second layer of a second material, the first layer being disposed between the write pole and the second layer. In certain aspects, the first material has a first magnetic moment that is lower than that of the write pole, and the second material has second magnetic moment that is less than the first magnetic moment. In certain aspects, the first layer is thicker than the second layer.

In certain aspects, the low magnetic moment wrapper includes a first material disposed at the top edge of the write pole and a second material disposed at the side edges of the write pole.

In certain aspects, the low magnetic moment wrapper is asymmetric around the write pole.

In certain aspects, the write pole has a magnetic moment of at least about 2.2 T and the low magnetic moment wrapper has a magnetic moment that is no more than about 2.0 T. In certain aspects, the write pole is composed of FeCo or an FeCo alloy. In certain aspects, the low magnetic moment wrapper includes CoNiFe, CoNiFeX, NiFe, NiFeX, CoFeX, NiX, FeX, or CoX, where X is Cr, Cu, B, Zr, Ta, or Nb.

In accordance with various aspects, the present disclosure describes recording heads for writing data on magnetic data storage media, the recording heads including a write pole for producing a write field to thereby record data confined to a data track on the magnetic data storage media, the write pole exhibiting an erasure field that extends beyond the data track, and a low magnetic moment wrapper disposed around the write pole, the low magnetic moment wrapper configured to reduce the erasure field without reducing the write field at the data track.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
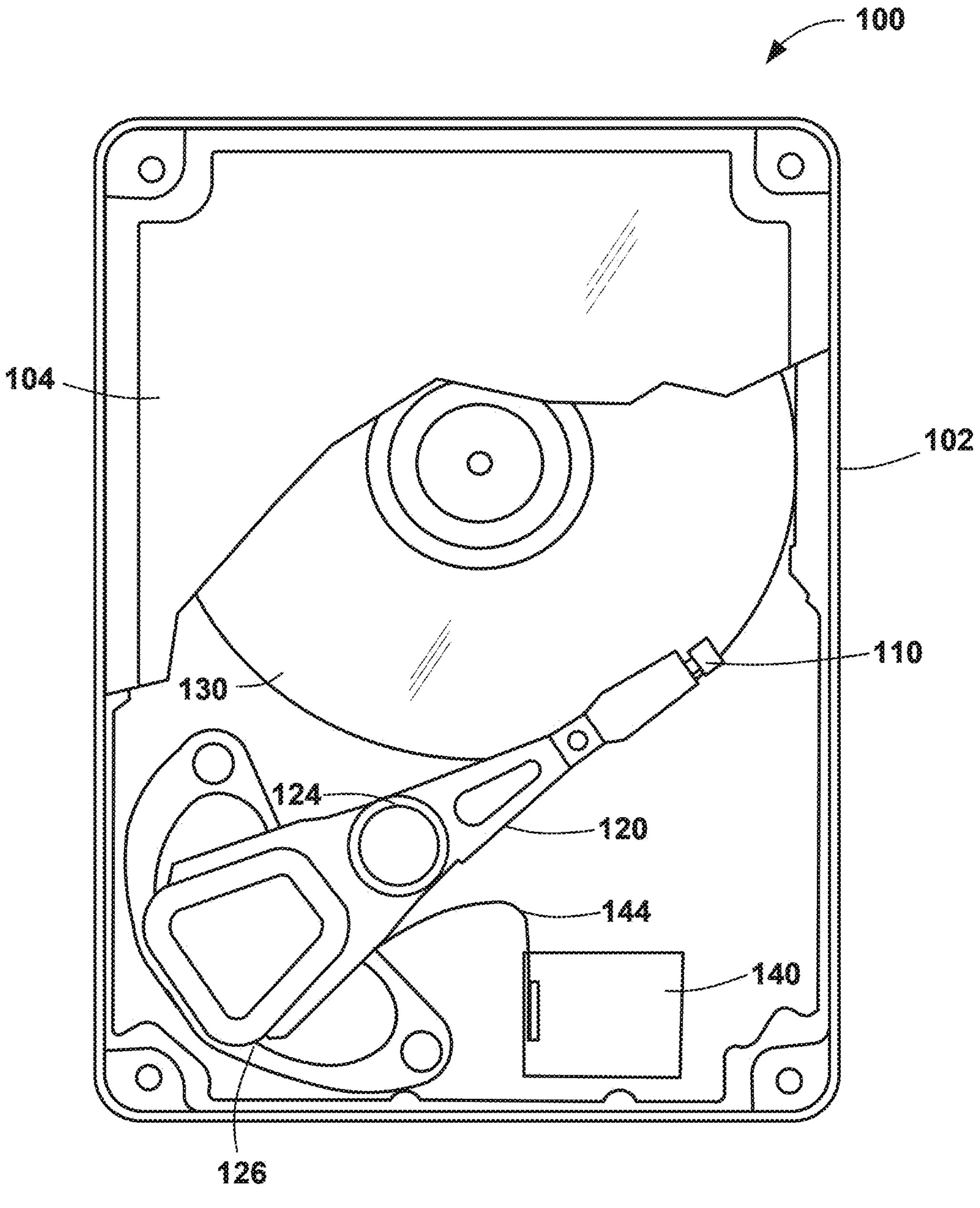
FIG. 1 is a schematic representation of an example hard disk drive that may incorporate recording heads in accordance with various aspects of the present disclosure.

The present disclosure relates to recording heads for magnetic writing of data in a disk drive, and in particular to write pole constructions that employ a low magnetic moment material disposed around the top and sides of the write pole tip, for example to reduce side track erasure effects by setting up a magnetization gradient at the write pole edges to thereby control the erasure field. Conventionally, erasure is controlled by using smaller write poles, harder media, and so forth. It is recognized in the present disclosure that such techniques may adversely impact writing effects and/or degrade transition and remanence signal-to-noise ratio, resulting in trade-offs between performance and erasure. In accordance with the present disclosure, the use of a lower moment "wrapper" around the write pole tip can reduce side track erasure without adversely impacting the write field at the point of writing.

The portion of a write field that may extend across adjacent tracks is called the fringing field (or the erasure field). When the fringing field from the write pole is too high, it can cause significant sidetrack erasure events that can lead to drive performance degradation. Write pole constructions in accordance with the present disclosure can function to decrease the erasure field while at the same time maintaining desirable write field strength. This may be accomplished by disposing a single layer or multiple layers of lower moment magnetic material(s) around the high moment magnetic write pole. The magnetization gradient generated by such a low moment wrapping structure can effectively decrease the magnetic field angle and the peak erasure field near the write pole edge where the erasure field hot spot normally occurs. Such a construction has little to no deleterious effect to the write field at the point of writing, for example proximate to the near-field transducer (NFT) of a heat-assisted magnetic recording (HAMR) writer.

In HAMR disk drives, certain design aspects of the recording media that are intended to improve areal density capability (ADC) by mitigating thermally induced jitter and improving remnant noise and read back signal-to-noise ratio can in turn leave the media structure susceptible to magnetic fringing fields from the write pole. When the fringing field is large, the media grain energy barrier becomes low, resulting in magnetization switching that occurs more easily with increased number of writes, which can erase recorded information from tracks adjacent to the track being written. Large fringing fields near the top and side edges of the write pole may extend up to 5 or 6 tracks away from the center track. Such effects can be mitigated in accordance with aspects of the present disclosure by disposing a low magnetic moment material at least around the sides and top of the write pole edges near the air-bearing surface of a HAMR recording head. It is understood that a magnetic moment expressed in units of Tesla (T) refers to the saturation moment, also known as the saturation magnetization.

Reference will now be made to the drawings, which depict one or more aspects described in this disclosure. However, it will be understood that other aspects not depicted in the drawings fall within the scope of this disclosure. Like numbers used in the figures refer to like components, steps, and so forth. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements. Likewise, the use of charts is meant to elucidate selected behaviors (whether physical, electrical, optical, chemical, etc.) without being bound to exactitude or to any theory.

FIG. 1 schematically depicts an example hard disk drive (HDD) device 100 that includes a recording head 110 having read and write capabilities. Recording head 110 is disposed on the end of an actuator arm 120 that is rotationally movable around a pivot 124 by use of a voice coil motor 126 (or other motor such as a piezoelectric motor). The recording head 110 is positioned in close proximity to the surface of magnetic media disk 130 such that the recording head can write data to and read data from tracks on the magnetic media 130 as the media disk spins by action of a spindle motor (not indicated). Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to spindle motor 135, and thereby control the spinning of the media disk(s) 130 along with the movement of the actuator 120 and the reading and writing of data via recording head 110.

The internal components of HDD 100 are contained within an enclosure 102, including cover 104, which is shown partially cut away to reveal the internal components. The enclosure 102 may be sealed to thereby control the environment within HDD 100, for example by filling the sealed enclosure with a gas mixture primarily composed of an inert gas such as helium. A host device can communicate with HDD 100 through a standardized interface (not shown). HDD 100 can operate on any magnetic recording principle, whether that be conventional magnetic recording (CMR), shingled magnetic recording (SMR), heat-assisted magnetic recording (HAMR), or any other type of recording technique now known or later developed, including combinations thereof. When configured for HAMR, recording head 110 may include additional components such as a near-field transducer (NFT) that couples in light delivered by a waveguide from a laser, the coupled light generating plasmonic activity that can be directed at the surface of the recording media to assist in writing data onto high coercivity media. Recording head 110 may include a write pole that is constructed in accordance with one or more aspects of the present disclosure.

Figure 2A:
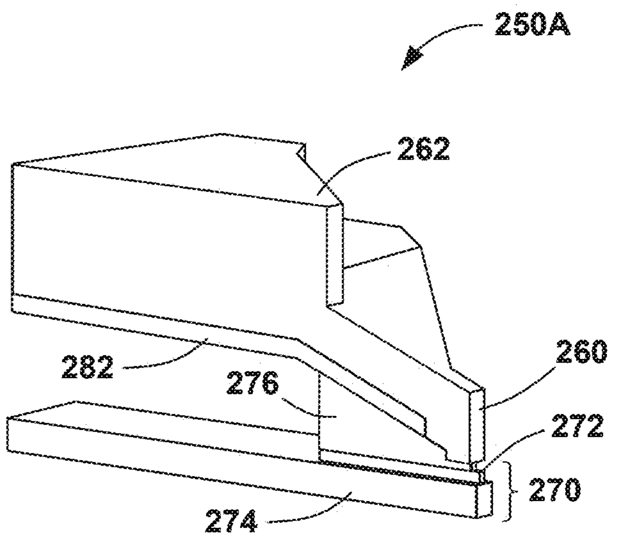
FIGS. 2A and 2B are schematic perspective views of a portion of a writer.

FIG. 2A shows a schematic cross-sectioned perspective view of a portion of a HAMR writer 250A that may be incorporated into a recording head according to aspects of the present disclosure. The axes indicate the orientation of the writer 250A with respect to a recording surface (not shown), with the X-axis being in the down-track (DT) direction (the direction of bit writing along a given track), the Y-axis being in the cross-track direction (the direction along which adjacent tracks are encountered), and the Z-axis being in the direction perpendicular to the air-bearing surface of the recording head (and perpendicular to the recording surface). Writer 250A includes a write pole 260 that extends from a write pole yoke 262 to the air-bearing surface. Write pole 260 is composed of a magnetic material (such as such as FeCo, FeCoX where X is Ni, Cr, or Ir, and which may include small amounts of other materials such as Ir, Rh, or Ru, and so forth) that exhibits a high magnetic moment, for example in a range of about 2.0 T to about 2.4 T, preferably about 2.2 T to about 2.4 T. In exemplary embodiments, the write pole may include Fe in an amount of about 60 to 70%, Co in an amount of about 30 to 40%, and the balance being Ni, Cr, or Ir, optionally with trace amounts of other material(s) as a dopant.

An NFT 270 that extends toward the air-bearing surface is located near the bottom edge of the write pole 260. NFT 270 includes an emitter disk that terminates in a peg 272 located near the air-bearing surface for directing and focusing plasmons toward the media surface to assist in magnetic recording. A waveguide 274 delivers electromagnetic radiation to the NFT 270 for producing plasmons. A middle disk 276 may be disposed between the emitter disk and the write pole 260. A heat channel 282 may be disposed between the middle disk 276 and the write pole 260 to conduct heat away from the NFT 270.

Figure 2B:
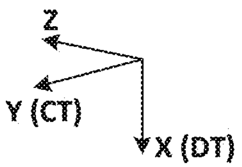
Figure 2B:
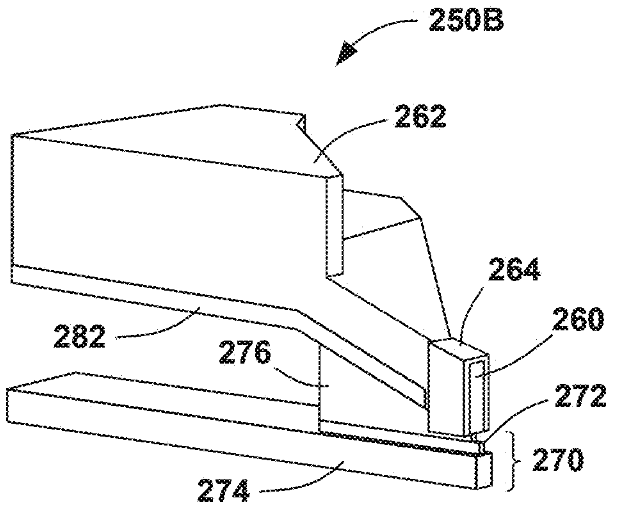

FIG. 2B shows a schematic cross-sectioned perspective view of a portion of a HAMR writer 250B that may be incorporated into a recording head according to aspects of the present disclosure. Writer 250B is identical to the writer 250A shown in FIG. 2A, except that writer 250B includes a low magnetic moment "wrapper" 264 disposed around edges of the write pole 260 near the air-bearing surface. For example, wrapper 264 may be disposed around the side edges and top edge of write pole 260 as indicated in FIG. 2B. Wrapper 264 may be composed any material having a relatively high permeability and relatively low magnetic moment such as CoNiFe, CoNiFeX, NiFe, NiFeX, CoFeX, NiX, FeX, CoX, or multilayers of these materials, where X may be Cr, Cu, B, Zr, Ta, Nb, and so forth. In accordance with the present disclosure, wrapper 264 having a low magnetic moment means that wrapper 264 has a magnetic moment that is less than the magnetic moment of the write pole 260. For example, wrapper 264 may have a magnetic moment in a range of about 0.5 T to about 2.0 T. Wrapper 264 may be composed of a single layer of material, may be composed of two or more layers of the same or different materials, or may be constructed to have different materials and/or different layers on the top edge of write pole 260 versus the side edges of write pole 260.

A write pole structure that includes a low moment wrapper such as shown in FIG. 2B may be employed to reduce the fringing erasure field at the recording surface of the magnetic media relative to constructions that have no such wrapper, thereby improving side track erasure failure mode in drive. Such a structure may include one or two (or more) thin layers of low magnetic moment material wrapping the write pole, which effectively decreases the off-track peak erasure field and reduces the sidetrack erasure. In conventional write pole constructions without a low moment wrapping, it can be observed during testing that a large erasure hot spot occurs near the write pole edge, relating to where there exists a strong Stoner-Wolfforth effective field. In constructions of the present disclosure, a wrapping of lower moment magnetic material(s) may be deposited over the magnetic write pole, and particularly around the top edge and side edges of the magnetic write pole (with the NFT being located proximate the bottom edge of the write pole). The magnetization gradient generated by write pole wrapping structures in accordance with aspects of the present disclosure can help decrease the magnetic field angle and the peak erasure field effectively near the write pole edge(s) where the erasure field hot spot(s) normally occurs.

Figure 3A:
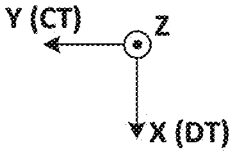
FIGS. 3A-3D are schematic views of the air-bearing surface of write pole tip constructions in accordance with various aspects of the present disclosure.
Figure 3A:
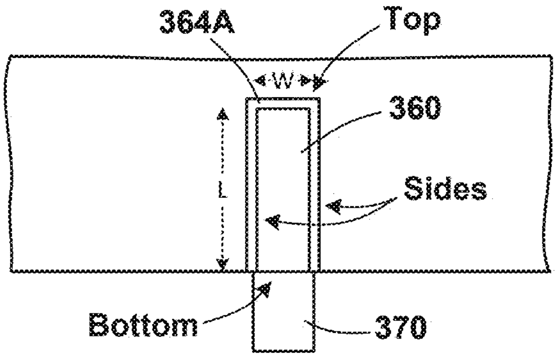

FIGS. 3A-3D show non-limiting examples of low moment wrapper configurations around a write pole 360, as viewed from the air-bearing surface, with the down-track (DT) X-direction being vertical on the page and the cross-track (CT) Y-direction being horizonal on the page. FIG. 3A indicates the width (W) of the write pole 360 in the CT direction and the length (L) of the write pole 360 in the DT direction, and also indicates what are referred to herein as the top, side, and bottom edges of the write pole 360. These dimensions and edge designations apply the same to each write pole 360 in FIGS. 3A-3D. The width W of a write pole 360 is correlated to the width of a data track that can be written on recording media. Typical write pole dimensions are W=150 to 250 nm and L=300 to 500 nm. As the magnetic media disk is rotated, the write pole 360 moves relative to the media disk in the DT direction. As such, the bottom edge of the write pole 360 is the leading edge, and the top edge of the write pole 360 is the trailing edge. In HAMR disk drives, an NFT 370 is used to locally heat a spot on the media to make it easier for the write field produced by the write pole 360 to write a magnetic state into the media. As such, the NFT 370 is disposed proximate to the bottom edge (that is, the leading edge) of the write pole 360.

In FIG. 3A, the write pole 360 is "wrapped" at its side and top edges with a single layer 364A of low magnetic moment material. For example, for a write pole having a magnetic moment of 2.4 T, the layer 364A may have a magnetic moment of 2.0 T or less, 1.6 T or less, 1.0 T or less, or 0.5 T or less. For an example write pole of width W=200 nm, the thickness of the low moment layer may be about 10 nm to about 100 nm. For the variations shown in FIGS. 3B-3D, the overall wrapper thickness and magnetic moment values may be in the same range as for the single layer wrapper shown in FIG. 3A.

Figure 3B:
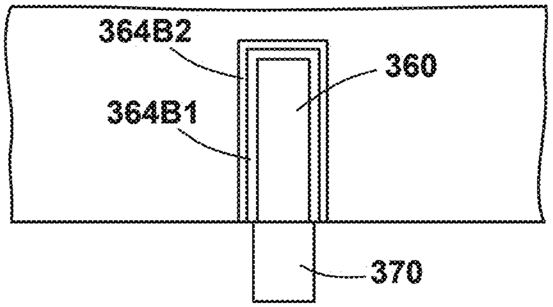
Figure 3C:
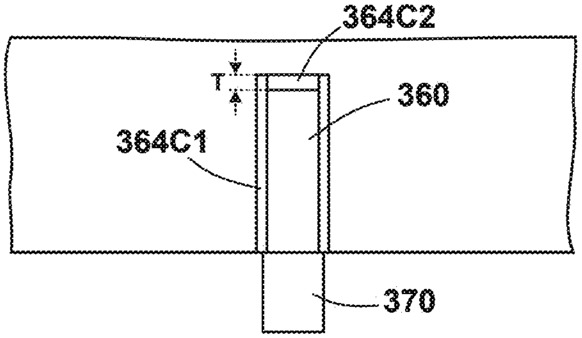
Figure 3D:
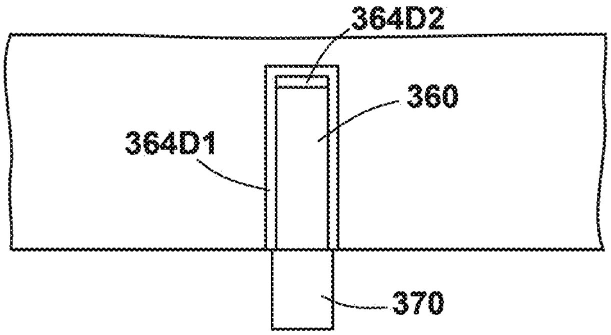

In FIG. 3B, the write pole 360 is wrapped with a bilayer low moment wrapper that includes a first layer 364B1 and a second layer 364B2. In some instances, second layer 364B2 may be no thicker than first layer 364B1, and in some instances, second layer 364B2 may be composed of a lower magnetic moment material than that of first layer 364B1. In FIG. 3C, a first low moment material may be formed as first layers 364C1 disposed at the side edges of write pole 360, and a second low moment material may be formed as a second layer 364C2 disposed at the top edge of write pole 360. The thicknesses and moments of the layers 364C1 and 364C2 may be selected to provide a desired field gradient under write field conditions. In FIG. 3D, a first low moment layer may be formed around the side edges and top edge of a write pole 360 that has been capped with a second low moment layer 364C2 disposed at the top edge of write pole 360. As will be appreciated, other constructions that include multiple layers of various low moment materials disposed in various ways around the edges of write poles may be contemplated.

Variations to the low moment wrapper constructions, such as those shown in FIGS. 3A-3D, may exhibit different impacts to field gradient and to side track erasure effects. Moreover, various low moment wrapper constructions may have different implications for the wafer processing steps and conditions needed to fabricate them. In certain aspects, a single low moment wrapper is deposited to conformally cover the side edges and top edge of the write pole. In certain aspects, a low moment layer is provided only at the top edge of the write pole. In certain aspects, low moment layers are provided only on the side edges of the write pole. In certain aspects, combinations of such variations may be provided such that the low moment wrapper/layer at the top edge and side edges are different (such as in FIGS. 3C and 3D). Different side and top layers may be fabricated by plating a first low moment material on just the top edge of the write pole, and then conformally coating a second low moment wrapper material over the resulting structure so that the additional layer covers the top and sides of the write pole. Optionally, a directional etch-back step (such as ion milling) may be used to remove the second wrapper material from over the first wrapper material at the top of the write pole. Alternatively, a low moment wrapper could be deposited by plating onto the write pole directly (with or without first depositing a seed layer). After forming the write pole, any photoresist frame that was used may be removed. Also, any remaining seed layer may be removed, for example by etching. The low moment material could then be plated on the side and top edges of the write pole to produce a relatively uniform low moment coating.

In a particular example of the construction shown in FIG. 3C, a write pole 360 having a length L of 430 nm and magnetic moment of 2.3 T may have a top layer 364C2 formed on the top edge of write pole 360 having a thickness T of 60 nm and a magnetic moment of 1.6 T. Side edge layers 364C1 may be formed with a layer thickness of about 23 nm and a magnetic moment of 1.0 T. Optionally, an additional wrapper layer may be formed over this construction.

In certain aspects, it may be desirable for the low moment wrapper to be asymmetric around the write pole. For example, in disk drives that implement zero skew writing and shingle magnetic recording, or in instances where writing is performed in only one direction (for example, from the inner diameter to the outer diameter of the media disk, or from the out diameter to the inner diameter of the media disk), an asymmetric low moment wrapper could be implement in which one side edge of the write pole has a different wrapper thickness, magnetic moment, and/or layer construction than the other side edge.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A heat-assisted magnetic recording disk drive comprising:

magnetic storage media;

a recording head comprising a write pole that extends to an air-bearing surface of the recording head such that at the air-bearing surface the write pole has a top edge, a bottom edge, and side edges that extend between the top edge and the bottom edge, the write pole configured to produce a magnetic write field for writing data on the magnetic storage media;

a near field transducer positioned proximate to the bottom edge of the write pole tip and configured to direct evanescent electromagnetic fields emanating from plasmon polaritons at the magnetic storage media to thereby facilitate magnetic recording; and a low magnetic moment wrapper that comprises at least one layer that is disposed around the side edges and top edge of the write pole, the low magnetic moment wrapper having a magnetic moment that is lower than that of the write pole.

2. The disk drive of claim 1, wherein the low magnetic moment wrapper comprises a bi-layer disposed around the side edges and the top edge of the write pole, the bi-layer including a first layer comprising a first material and a second layer comprising a second material, the first layer being disposed between the write pole and the second layer.

3. The disk drive of claim 2, wherein the first material has a first magnetic moment that is lower than that of the write pole, and the second material has second magnetic moment that is less than the first magnetic moment.

4. The disk drive of claim 2, wherein the first layer is thicker than the second layer.

5. The disk drive of claim 1, wherein the low magnetic moment wrapper is asymmetric around the write pole.

6. The disk drive of claim 1, wherein the write pole has a magnetic moment of at least about 2.2 T and the low magnetic moment wrapper has a magnetic moment that is no more than about 2.0 T.

7. The disk drive of claim 1, wherein the write pole is comprised of FeCo or an FeCo alloy.

8. The disk drive of claim 1, wherein the low magnetic moment wrapper includes CoNiFe, CoNiFeX, NiFe, NiFeX, CoFeX, NiX, FeX, or CoX, where X is Cr, Cu, B, Zr, Ta, or Nb.

9. A heat-assisted magnetic recording disk drive comprising:

magnetic storage media;

a recording head comprising a write pole that extends to an air-bearing surface of the recording head such that at the air-bearing surface the write pole has a top edge, a bottom edge, and side edges that extend between the top edge and the bottom edge, the write pole configured to produce a magnetic write field for writing data on the magnetic storage media;

a near field transducer positioned proximate to the bottom edge of the write pole tip and configured to direct evanescent electromagnetic fields emanating from plasmon polaritons at the magnetic storage media to thereby facilitate magnetic recording; and a low magnetic moment wrapper disposed around the side edges and top edge of the write pole, the low magnetic moment wrapper having a magnetic moment that is lower than that of the write pole, wherein the low magnetic moment wrapper comprises a first material disposed at the top edge of the write pole and a second material disposed at the side edges of the write pole.

10. A recording head for writing data on magnetic data storage media, the recording head comprising:

a write pole for producing a write field to thereby record data confined to a data track on the magnetic data storage media, the write pole exhibiting an erasure field that extends beyond the data track, wherein the write pole has a rectangular shape at an air-bearing surface of the recording head, the rectangular shape of the write pole having a length in a down-track direction, the length extending from a top edge of the write pole to a bottom edge of the write pole, and the rectangular shape of the write pole having a width in a cross-track direction, the width extending between opposing side edges of the write pole; and a low magnetic moment wrapper disposed around the top edge and side edges of the write pole, the low magnetic moment wrapper configured to reduce the erasure field without reducing the write field at the data track.

11. The recording head of claim 10, wherein the write pole is composed of a FeCo alloy.

12. The recording head of claim 11, wherein the FeCo alloy includes Fe in an amount of about 60 to 70%, and Co in an amount of about 30 to 40%.

13. The recording head of claim 10, wherein the write pole has a magnetic moment of about 2.2 T to about 2.4 T.

14. The recording head of claim 10, wherein the wrapper has a magnetic moment of about 1.6 T or less.

15. The recording head of claim 10, wherein the low magnetic moment wrapper includes a first layer disposed to cover the top edge of the write pole, and a second layer disposed to cover the side edges of the write pole.

16. The recording head of claim 15, wherein the write pole has a magnetic moment of about 2.3 T, the first layer of the wrapper has a magnetic moment of about 1.6 T, and the second layer has a magnetic moment of about 1.0 T.

* * * * *